US011459189B2

(12) United States Patent
Behr

(10) Patent No.: US 11,459,189 B2
(45) Date of Patent: Oct. 4, 2022

(54) TRAY SEALER WITH TWO-LANE CONVEYOR ARRANGEMENT AND CONVEYING METHOD

(71) Applicant: MULTIVAC SEPP HAGGENMUELLER SE & CO. KG, Wolfertschwenden (DE)

(72) Inventor: Markus Behr, Kempten (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 89 days.

(21) Appl. No.: 17/066,640

(22) Filed: Oct. 9, 2020

(65) Prior Publication Data
US 2021/0107749 A1 Apr. 15, 2021

(30) Foreign Application Priority Data
Oct. 9, 2019 (DE) .......................... 102019215451.4

(51) Int. Cl.
*B65G 47/68* (2006.01)
*B65B 7/16* (2006.01)
(Continued)

(52) U.S. Cl.
CPC ............ *B65G 47/681* (2013.01); *B65B 7/162* (2013.01); *B65B 35/24* (2013.01); *B65B 65/006* (2013.01);
(Continued)

(58) Field of Classification Search
CPC .. B65G 47/681; B65G 21/2072; B65G 23/00; B65G 2811/0621; B65G 2811/0673;
(Continued)

(56) References Cited

U.S. PATENT DOCUMENTS 3,144,119 A 8/1964 Nigrelli et al.
3,224,550 A * 12/1965 Nigrelli .................. B65B 35/54
198/444
(Continued)

FOREIGN PATENT DOCUMENTS

CA 2080055 A1 4/1993
DE 31 28 460 A1 2/1983
(Continued)

OTHER PUBLICATIONS

EPO, Patent Translate EP 3219649A1 (Year: 2022).*
(Continued)

*Primary Examiner* — Mark A Deuble
(74) *Attorney, Agent, or Firm* — Brooks Kushman P.C.

(57) ABSTRACT

A tray sealer comprises a conveyor arrangement for conveying packaging trays along a conveying direction. The conveyor arrangement comprises a first conveyor device for conveying a first line of packaging trays along the conveying direction, a second conveyor device running laterally alongside the first conveyor device for conveying a second line of packaging trays along the conveying direction, and a center guide which is arranged between the first conveyor device and the second conveyor device and extends along the conveying direction. The conveyor arrangement further comprises a third conveyor device for conveying packaging trays along the conveying direction. The third conveyor device extends adjoining the second conveyor device in terms of the conveying direction laterally alongside the first conveyor device.

20 Claims, 3 Drawing Sheets

(51) Int. Cl.
*B65B 35/24* (2006.01)
*B65B 65/00* (2006.01)
*B65G 21/20* (2006.01)
*B65G 23/00* (2006.01)

(52) U.S. Cl.
CPC ......... *B65G 21/2072* (2013.01); *B65G 23/00* (2013.01); *B65G 2811/0621* (2013.01); *B65G 2811/0673* (2013.01)

(58) Field of Classification Search
CPC ....... B65B 7/162; B65B 35/24; B65B 65/006; B65B 7/164; B65B 35/405; B65B 35/54; B65B 35/56; B65B 7/165; B65B 7/167; B29C 65/787; B29C 66/131; B29C 66/53421; B29L 2031/7164
See application file for complete search history.

(56) References Cited

U.S. PATENT DOCUMENTS

| | | | | |
|---|---|---|---|---|
| 3,908,342 | A * | 9/1975 | Raque | B29C 65/18 83/326 |
| 4,004,677 | A * | 1/1977 | Heier | B65G 47/681 198/452 |
| 9,334,074 | B2 * | 5/2016 | Spix | B65B 61/065 |
| 2013/0025239 | A1 | 1/2013 | Mader et al. | |
| 2013/0133286 | A1 * | 5/2013 | Taghipour | B65B 7/164 53/202 |
| 2014/0374217 | A1 * | 12/2014 | Buchenberg | B65B 35/36 198/419.3 |
| 2016/0339484 | A1 * | 11/2016 | Mader | B29C 66/53461 |

FOREIGN PATENT DOCUMENTS

| | | | |
|---|---|---|---|
| DE | 36 42 764 A1 | 3/1988 | |
| DE | 41 33 588 A1 | 4/1993 | |
| DE | 10 2011 106 476 A1 | 1/2013 | |
| DE | 10 2011 108 919 A1 | 1/2013 | |
| EP | 3219649 A1 * | 9/2017 | ............. B65B 43/52 |
| JP | H04 64521 A | 2/1992 | |
| JP | H08 67334 A | 3/1996 | |
| JP | 2015 054766 A | 3/2015 | |
| WO | 2011/018391 A1 | 2/2011 | |

OTHER PUBLICATIONS

German Office Action dated Jul. 7, 2020, Applicant No. 10 2019 215 451.4, 8 Pages.
European Search Report dated Feb. 16, 2021 (with English Machine Translation), Application No. 20193113.6-1017, Applicant MULTIVAC Sepp Haggenmueller SE & Co. KG, 17 Pages.

* cited by examiner

TRAY SEALER WITH TWO-LANE CONVEYOR ARRANGEMENT AND CONVEYING METHOD

CROSS-REFERENCE TO RELATED APPLICATIONS

This application claims foreign priority benefits under 35 U.S.C. § 119(a)-(d) to European patent application number DE 10 2019 215 451.4, filed Oct. 9, 2019, which is incorporated by reference in its entirety.

TECHNICAL FIELD

The disclosure relates to a tray sealer with a conveyor arrangement for conveying packaging trays, and to a method for conveying packaging trays by way of a conveyor arrangement of a tray sealer.

BACKGROUND

A packaging machine configured as a tray sealer is known from DE 10 2011 108 919 A1 in which packaging trays filled with products are fed to a sealing station in two lanes along a conveying direction by way of two feed belts running parallel to each other. In the sealing station, the packaging trays are closed with a top film. The closed packaging trays are then conveyed onward again in two lanes along the conveying direction by way of two discharge belts running parallel to each other. A center guide is provided between the feed belts running in parallel, between the regions of the sealing station associated with the two packaging lines, and between the discharge belts running in parallel (in a starting region of the discharge belts). A gripper system is provided for relocating the packaging trays from the feed belts into the sealing station and for relocating the closed packaging trays from the sealing station onto the discharge belts. The gripper system comprises a gripper for each of the two packaging lines which is advanced from the outside toward the packaging trays and presses them against the center guide. The grippers are subsequently moved along the conveying direction, whereby the packaging trays held between the respective gripper and the center guide are carried along.

Due to the center guide being present in the starting region of the discharge belts between the discharge belts, there is a gap also between the two discharge belts in terms of the conveying direction downstream of the center guide. This can limit the options for further processing steps on the discharge belts. For example, converging the two lines of packaging trays is difficult, in particular if the converged packaging line is to run at the center.

SUMMARY

It is an object of the disclosure to simplify with as little effort as possible the further processing of packaging trays which are conveyed on conveyor devices of a tray sealer running laterally alongside one another and are at least in part separated by a center guide.

According to an aspect, the disclosure relates to a tray sealer with a conveyor arrangement for conveying packaging trays along a conveying direction. The conveyor arrangement comprises a first conveyor device for conveying a first line of packaging trays along the conveying direction and a second conveyor device running in terms of the conveying direction laterally alongside the first conveyor device for conveying a second line of packaging trays along the conveying direction. In addition, the conveyor arrangement comprises a center guide arranged between the first conveyor device and the second conveyor device. The center guide extends along the conveying direction. The conveyor arrangement also comprises a third conveyor device for conveying packaging trays along the conveying direction. The third conveyor device extends adjoining the second conveyor device in terms of the conveying direction laterally alongside the first conveyor device.

According to the disclosure, two adjoining conveyor devices, namely the second conveyor device and the third conveyor device, extend laterally alongside the first conveyor device. Due to the second conveyor device and the third conveyor device being configured as separate conveyor devices, they can be configured differently and adapted to the requirements at the respective position. This broadens the options for processing the packaging trays.

The first conveyor device, the second conveyor device, and the third conveyor device may ran parallel to each other. The first conveyor device, the second conveyor device, and the third conveyor device may run parallel to the conveying direction.

The first conveyor device, the second conveyor device, and the third conveyor device may each be configured in the form of a conveyor belt. The respective conveyor belts may each comprise an upper run for receiving the packaging trays. The first conveyor device, the second conveyor device, and the third conveyor device are each driven preferably by no more than one drive.

The third conveyor device may reach laterally closer to the first conveyor device than the second conveyor device. As a result, a gap towards the first conveyor device can be reduced in the region of the third conveyor device. This simplifies, for example, moving the packaging trays across the borders of the conveyor devices running side by side.

The third conveyor device preferably has a greater width (in a horizontal lateral direction perpendicular to the conveying direction) than the second conveyor device. This allows existing space to be used and the available conveying surface to be enlarged. A lateral end edge of a conveying surface of the second conveyor device facing away from the first conveyor device may be at least substantially collinear with a lateral end edge of a conveying surface of the third conveyor device facing away from the first conveyor device. A lateral end edge of the conveying surface of the third conveyor device facing the first conveyor device may reach closer to the first conveyor device than a lateral end edge of the conveying surface of the second conveyor device facing the first conveyor device.

The third conveyor device may extend further from the center guide in terms of the conveying direction. The second conveyor device may be adapted to the space available in the region of the center guide. The third conveyor device may be adapted to the space available after the center guide.

The conveyor arrangement may comprise a first drive arrangement which is configured to jointly drive the first conveyor device and the third conveyor device. This ensures that the first conveyor device and the third conveyor device are synchronized. It can be ensured in a simple manner in particular that the first conveyor device and the third conveyor device are operated at a common conveying speed. It is also ensured that the idle times and running times of the first conveyor and the third conveyor are perfectly coordinated. If the first conveyor device and the third conveyor device are driven with the common first drive arrangement, one drive arrangement can be dispensed with as compared to driving the first conveyor device and the third conveyor device individually.

The first drive arrangement may comprise, for example, a first drive shaft which is in contact with the first conveyor device for driving the first conveyor device and in contact with the third conveyor for driving the third conveyor device. A simple structure can he realized by using a common drive shaft.

The conveyor arrangement may comprise a second drive arrangement which is configured to drive the second conveyor device separately from the first conveyor device and the third conveyor device. Since the chronological sequence of driving the third conveyor device and driving the second conveyor device can be freely determined due to the second conveyor device being driven separately, a position on the third conveyor device, at which packaging trays are transferred from the second conveyor device, can be determined by suitably driving the conveyor devices. The second drive arrangement may comprise a second drive shaft which is in contact with the second conveyor device for driving the second conveyor device.

The tray sealer may comprise a control device which is configured to actuate the second drive arrangement in such a way that the second conveyor device is conveying for part of the running time of the first conveyor device and the third conveyor device and is at a standstill for part of the running time of the first conveyor device and the third conveyor device. For example, while the second conveyor is at a standstill, the first conveyor device and the third conveyor device can run until a point has been reached at an end of the third conveyor device which in terms of the conveying direction is rearward and at which a packaging tray present on the second conveyor device is to be transferred. At a respective point in time, the second conveyor device may be driven for transferring the packaging tray to the third conveyor device. The transfer positions of the packaging trays to the third conveyor device can thus be controlled in a suitable manner.

The tray sealer may comprise a line converger which is configured to converge the first line of packing trays and the second line of packing trays to form a common line of packing trays in terms of the conveying direction downstream of the center guide. A common line of packaging trays thus converged may then subsequently be processed in one lane.

The line converger may converge the first line of packaging trays and the second line of packaging trays at least substantially at the center on a conveying surface formed jointly by the first conveyor device and the third conveyor device. Such converging at the center can facilitate the further processing of the packaging trays by downstream stations.

It is particularly advantageous for configurations with a line convergence to have a lateral spacing between a conveying surface of the first conveyor device and a conveying surface of the third conveyor device be smaller than a lateral spacing between the conveying surface of the first conveyor device and a conveying surface of the second conveyor device.

A work cycle of a line convergence can be such that, for example, the control device first drives the first drive arrangement for driving the first conveyor device and the third conveyor device, so that packaging trays present on the first conveyor device are conveyed along the conveyor device while at the same time the second drive arrangement and therefore the second conveyor device are at a standstill.

When the packaging trays from the first conveyor device have passed a beginning of the third conveyor device in terms of the conveying direction, then the control device can actuate the second drive arrangement for driving the second conveyor device. The packaging trays are then transferred from the second conveyor device to the third conveyor device. Thereby, the first conveyor device and the third conveyor device can continue running. The packaging trays from the first conveyor device and the packaging trays from the second conveyor device are fed successively to the line converger.

The line converger may be configured to modify the lateral positioning of the packaging trays of the first line of packaging trays and of packaging trays of the second line of packaging trays on the common conveying surface formed by the first conveyor device and the third conveyor device. However, this is not absolutely necessary. It would also be conceivable, for example, that the line converger redirects only the packaging trays of the first line of packaging trays or, alternatively, only the packaging trays of the second line of packaging trays and lets the packaging trays of the respective other line continue to run straight.

The line converger may comprise a first redirection device which redirects packaging trays of the first line of packaging trays or in terms of the conveying direction shifts them laterally. The line converger may comprise a second redirection device which redirects packaging trays of the second line of packaging trays or in terms of the conveying direction shifts them laterally. The line converger may comprise the first redirection device and at the same time the second redirection device. Alternatively, the line converger could comprise either only the first redirection device or only the second redirection device.

The conveyor arrangement may be arranged in terms of the conveying direction downstream of a sealing station of the tray sealer that is configured to seal the packaging trays and may be configured to transport the sealed packaging trays away. The center guide may form an abutment surface, with the aid of which grippers of the tray sealer can relocate packaging trays from the sealing station to the first conveyor device and the second conveyor device, in particular can relocate them along the conveying direction.

The disclosure also comprises a method for conveying packaging trays along a conveying direction by way of a conveyor arrangement of a tray sealer. The tray sealer according to the disclosure may be suitable, designed and/or configured to Carry out the method. Features described with regard to the tray sealer may be transferred to the method, and vice versa.

According to an aspect of the disclosure, a method for conveying, packaging trays along a conveying direction by way of a conveyor arrangement of a tray sealer comprises conveying a first line of packaging trays along the conveying direction with a first conveyor device. The method further comprises conveying a second line of packaging trays along the conveying direction with a second conveyor device which runs laterally alongside the first conveyor device. The second conveyor device is separated from the first conveyor device by a center guide extending along the conveying direction between the first conveyor device and the second conveyor device. The method comprises driving a third conveyor device which in terms of the conveying direction adjoins the second conveyor device and extends laterally alongside the first conveyor device along the conveying direction.

The method may comprise jointly driving the first conveyor device and the t conveyor device with a common first drive arrangement.

The method may comprise driving the second conveyor device separately from the first conveyor device and the third conveyor device with a second drive arrangement.

The second drive arrangement may be operated for driving the second conveyor device during part of a running time of the first conveyor device and the third conveyor device and may stand still during a part of the running time of the first conveyor device and the third conveyor device.

The method may also comprise converging the first line of packaging trays and the second line of packaging trays, in particular using a line converger. Converging the first line of packaging trays and the second line of packaging trays may take place in terms of the conveying direction downstream of the center guide.

To converge the first line of packaging trays and the second line of packaging trays, packaging trays of the first line of packaging trays and/or packaging trays of the second line of packaging trays may be pushed in a direction perpendicular to the conveying direction. This can be done, for example, by one or more static redirection devices. Alternatively, the packagings could also be pushed by movable redirection devices, such as by a pusher.

After the first line of packaging trays and the second line of packaging trays have been converged, the packaging trays may be conveyed at least substantially centrally on a conveying surface formed by the first conveyor device and the third conveyor device.

The method may also comprise closing the packaging trays in a sealing station of the tray sealer. The packaging trays may be closed in particular by sealingly attaching a top film in the sealing station.

DETAILED DESCRIPTION

Figure 1:
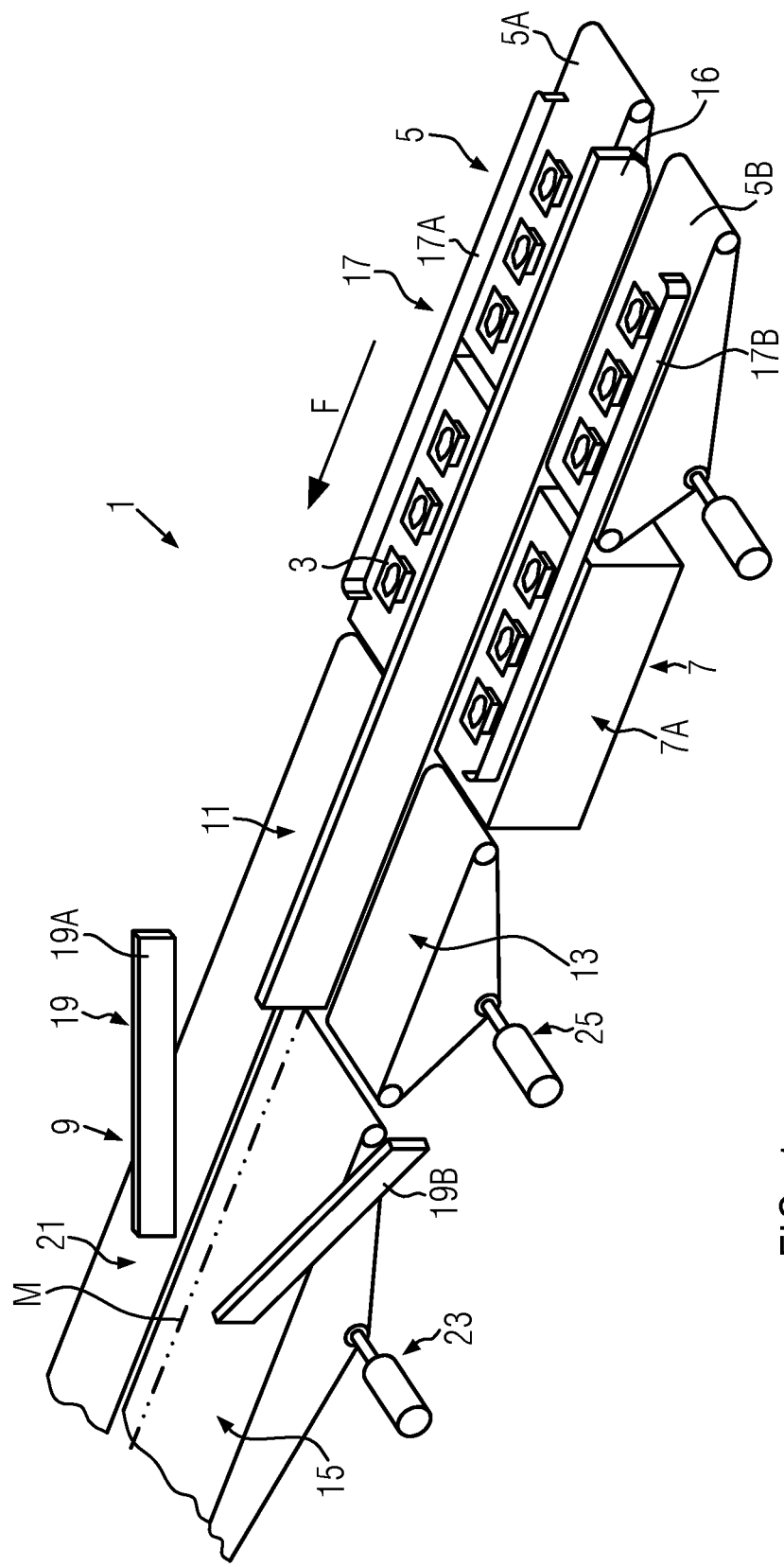
FIG. 1 shows a schematic partial perspective view of a tray sealer according to an embodiment.

FIG. 1 shows a schematic partial view of a tray sealer 1 for closing packaging trays 3 according to an embodiment. Tray sealer 1 can process two lines of packaging trays 3 at the same time, i.e., has two lanes. A feed device 5, a sealing station 7 and a conveyor arrangement 9 configured as a discharge device are provided consecutively along a conveying direction F. Feed device 5 comprises two feed belts 5A, 5B running parallel to conveying direction F and conveying along conveying direction F for feeding packaging trays 3 to be sealed to sealing station 7. A first line of packaging trays 3 is fed on first feed belt 5A and a second line of packaging trays 3 is fed on second feed belt 5B. Sealing station 7 can simultaneously process packaging trays 3 of the first line of packaging trays 3 and packaging trays 3 of the second line of packaging trays 3. Sealing station 7 comprises a sealing tool lower part 7A which in the illustrated embodiment is formed in two parts (one part for the first line of packaging trays 3 and one part for the second line of packaging trays 3). Sealing station 7 also comprises a sealing tool upper part, not shown for the sake of clarity, which is arranged above sealing tool lower part 7A and which interacts with sealing tool lower part 7A to seal packaging trays 3 by sealing a top film thereonto.

Provided in terms of conveying direction F downstream of sealing station 7 is conveyor arrangement 9 for transporting closed packaging trays 3 onward along conveying direction F away from sealing station 7. Conveyor arrangement 9 comprises a first conveyor device 11, a second conveyor device 13 and a third conveyor device 15 which are each configured as a conveyor belt conveying along conveying direction F. First conveyor device 11 adjoins sealing station 7 quasi as a continuation of first feed belt 5A. Second conveyor device 13 adjoins sealing station 7 quasi as a continuation of second feed belt 5B. Second conveyor device 13 runs parallel to first conveyor device 11 and laterally alongside first conveyor device 11. Third conveyor device 15 runs parallel to first conveyor device 11 and laterally alongside first conveyor device 11. Third conveyor device 15 is arranged in terms of conveying direction F downstream of second conveyor device 13.

A center guide 16 extends along conveying direction F between first feed belt 5A and second feed belt 5B, between the first part of sealing tool lower part 7A and the second part of sealing tool lower part 7A and between first conveyor device 11 and second conveyor device 13 of conveyor arrangement 9.

A gripper system 17 is provided for relocating packaging trays 3 to be closed from feed device 5 into sealing station 7 and for relocating closed packaging trays 3 from sealing station 7 onto conveyor arrangement 9. Gripper system 17 comprises a first gripper 17A which is provided on the side of center guide 16 on which first feed belt 5A and first conveyor device 11 of conveyor arrangement 9 are disposed. Second gripper 17B is disposed on the other side of center guide 16 on which second feed belt 5B and second conveyor device 13 of conveyor arrangement 9 are also disposed. After a sealing process in sealing station 7 has terminated, first gripper 17A and second gripper 17B move laterally inwardly perpendicular to conveying direction F toward center guide 16. Grippers 17A, 17B contact packaging trays 3 to be closed that are disposed on feed device 5 and packaging trays 3 that are disposed in sealing station 7 and push them against center guide 16. Grippers 17A, 17B are then moved along conveying direction F. Packaging trays 3 that are held between respective grippers 17A, 17B and center guide 16 are taken along. Following the motion of grippers 17A, 17B in conveying direction F, packaging trays 3 to be closed, which were previously present on feed device 5 are located in sealing station 7. Following the motion of grippers 17A, 17B, closed packaging trays 3 previously present in sealing station 7 are located on first conveyor device 11 or second conveyor device 13 of conveyor arrangement 9, respectively. For improved engagement of grippers 17A, 17B with packaging trays 3, grippers 17A, 17B can have engagement elements (not shown). Once closed trays 3 have been relocated from sealing station 7 to conveyor arrangement 9, a first line of packaging trays 3 is present on first conveyor device 11 and a second line of packaging trays 3 is present on second conveyor device 13.

In order to facilitate further processing of packaging trays 3, third conveyor device 15 is wider inwardly in the direction towards first conveyor device 11 than second conveyor device 13. As a result, third conveyor device 15 reaches closer to first conveyor device 11 than second conveyor device 13. Third conveyor device 15 adjoins center guide 16 downstream of second conveyor device 13 and quasi bridges the gap that would arise between the conveyor devices running side by side if second conveyor device 13 were simply continued. This facilitates, for example, further processing of packaging trays 3 in the region downstream of center guide 16.

In the illustrated embodiment, the first line of packaging trays 3 and the second line of packaging trays 3 are to be converged downstream of center guide 16 to form a common line of packaging trays 3. For this purpose, a line converger 19 is provided and comprises a first redirection device 19A and a second redirection device 19B. The first redirection device is provided substantially above first conveyor device 11 and configured to redirect packaging trays 3 conveyed on first conveyor device 11 in the direction toward a center M of common conveying surface 21 formed by first conveyor device 11 and third conveyor device 15. In addition to the motion along conveying direction F due to being conveyed by first conveyor device 11, packaging trays 3 of the first line of packaging trays 3 are therefore also pushed by first redirection device 19A perpendicular to conveying direction F. Second redirection device 19B is provided at least in part upstream of third conveyor device 15. Second redirection device 19B is configured to redirect packaging trays 3 of the second line of packaging trays 3 in the direction toward center M of common conveying surface 21 formed by first conveyor device 11 and third conveyor device 15. In addition to the motion along conveying direction F due to being conveyed by third conveyor device 15, packaging trays 3 of the second line of packaging trays 3 are also pushed by second redirection device 19B in a direction perpendicular to conveying direction F.

Figure 2:
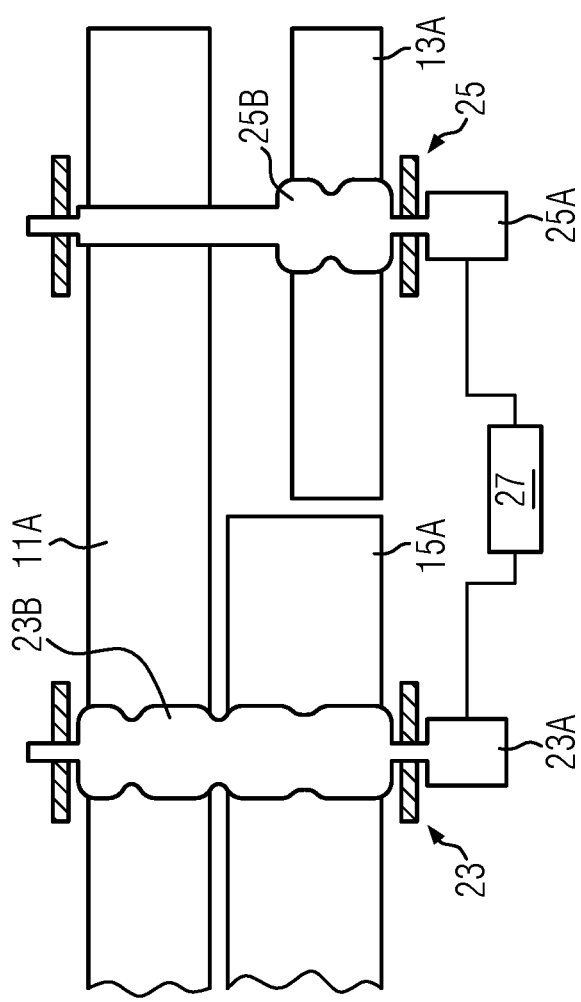
FIG. 2 shows a schematic top view onto the conveyor arrangement of the tray sealer according to the embodiment, where the respective upper runs of the conveyor devices have been omitted in order to show components located therebeneath.

In the illustrated embodiment, first conveyor device 11 and third conveyor device 15 are driven jointly by way of a first drive arrangement 23. Second conveyor device 13 is driven separately from first conveyor device 11 and third conveyor device 15 by a second drive arrangement 25. This situation is shown in FIG. 2 which shows a top view onto conveyor arrangement 9 in which the respective upper runs of conveyor devices 11, 13, 15 has been omitted in order to gain insight into the drive configuration of conveyor devices 11, 13, 15. First drive arrangement 23 comprises a first drive motor 23A and a first drive shaft 23B which is driven to rotate by first drive motor 23A. First drive shaft 23B extends perpendicular to conveying direction F. A first belt 11A of first conveyor device 11 runs over and is driven by first drive shaft 23B. In parallel thereto, a third belt 15A of third conveyor device 15 runs over and is likewise driven by first drive shaft 23B. First belt 11A can provide a conveying surface of first conveyer device 11. Third belt 15A can provide a conveying surface of third conveyor device 15.

Second drive arrangement 25 comprises a second drive motor 25A and a second drive shaft 25B driven by the second drive motor 25A to rotate. Second drive shaft 25B runs perpendicular to conveying direction F. Second belt 13A of second conveyor device 13 runs over and is driven by second drive shaft 25B. Second belt 13A may provide a conveying surface of second conveyor device 13. First belt 11A of first conveyor device 11 does cross second drive shaft 25B but is not in engagement with second drive shaft 25b. FIG. 2 also shows a control device 27 which controls first drive device 23 and second drive device 25.

Figure 3:
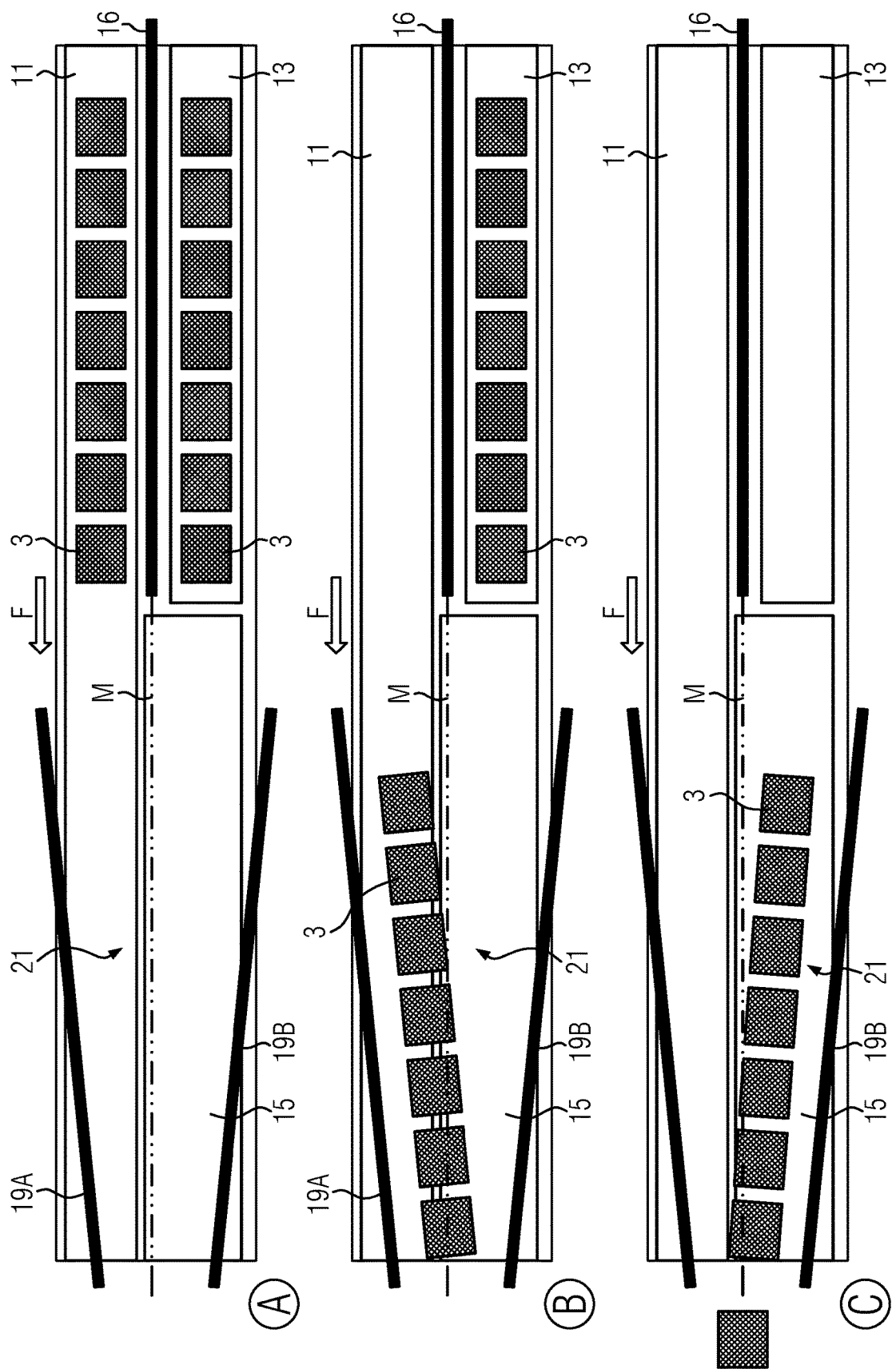
FIG. 3 shows a schematic representation of a sequence of operating states of the conveyor arrangement of the tray sealer according to the embodiment in an application for line convergence.

FIG. 3 in a schematic top view onto conveyor arrangement 9 shows a chronological sequence of operating states of conveyor arrangement 9.

In part A of FIG. 3 the situation is shown after closed packaging trays 3 have been relocated onto first conveyor device 11 and second conveyor device 13 by gripper system 17. A first line of packaging trays 3 is disposed on conveyor device 11 and a second line of packaging trays 3 on second conveyor device 13. In this operating state, first conveyor device 11, second conveyor device 13, and third conveyor device 15 can be at a standstill.

From the state shown in part A of FIG. 3, control device 27 actuates first drive arrangement 23 in such a way that first drive arrangement 23 drives first conveyor device 11 and third conveyor device 15 for conveying along conveying direction F. As a result, the first line of packaging trays 3 present on first conveyor device 11 is conveyed along conveying direction F. The first line of packaging trays 3 there contacts first redirection device 19A, as a result of which the first line of packaging trays 3 is pushed laterally in the direction of a center line M of common conveying surface 21 that is formed by first conveyor device 11 and third conveyor device 15.

After the first line of packaging trays 3 has passed at least center guide 16 and the beginning of third conveyor device 15, control device 27 actuates second drive arrangement 25 to drive second conveyor device 13 for conveying the second line of packaging trays 3 in conveying direction F. First conveyor device 11 and third conveyor device 15 continue to be driven. As shown in part C of FIG. 3, the second line of packaging, trays 3 is thereby conveyed onward from second conveyor device 13 to third conveyor device 15. The second line of packaging trays 3 contacts second redirecting device 19B by being conveyed onward on third conveyor device 15 and is thereby redirected in a direction perpendicular to conveying direction F onto center line M of common conveying surface 21 formed by first conveyor device 11 and third conveyor device 15. The second line of packaging trays 3 lines up on common conveying surface 21 behind the first line of packaging trays 3, so that a common line of packaging trays 3 is formed.

An embodiment has been described in which the packaging trays are further processed by performing line convergence. However, the disclosure is not restricted thereto and an embodiment according to the disclosure can also be used advantageously for other forms of further processing.

In the embodiment described, line converger 19 comprises first redirection device 19A and second redirection device 19B. However, it would also be conceivable that only either first redirection device 19A or second redirection device 19B is provided, but not both of them. This can be particularly advantageous if the lines do not have to be converged at the center. It would also be conceivable to provide a completely different technique for converging the lines. For example, packaging trays 3 could be pushed laterally by way of a pusher that is movable perpendicular to conveying direction F on common conveying surface 21 formed by first conveyor device 11 and third conveyor device 15.

What is claimed is:

1. A tray sealer with a conveyor arrangement for conveying packaging trays along a conveying direction, the conveyor arrangement comprising:
   a first conveyor device for conveying a first line of packaging trays along the conveying direction;
   a second conveyor device running laterally alongside the first conveyor device for conveying a second line of packaging trays along the conveying direction;

a center guide which is arranged between the first conveyor device and the second conveyor device and extends along the conveying direction; and a third conveyor device for conveying packaging trays along the conveying direction, wherein the third conveyor device extends adjoining the second conveyor device in terms of the conveying direction laterally alongside the first conveyor device, and the third conveyor device reaches laterally closer to the first conveyor device than the second conveyor device.

2. The tray sealer according to claim 1, wherein the third conveyor device has a greater width than the second conveyor device.

3. The tray sealer according to claim 1, wherein the third conveyor device in terms of the conveying direction adjoins the center guide.

4. The tray sealer according to claim 1, wherein the conveyor arrangement further comprises a first drive arrangement which is configured to jointly drive the first conveyor device and the third conveyor device.

5. The tray sealer according to claim 4, wherein the conveyor arrangement further comprises a second drive arrangement which is configured to drive the second conveyor device separately from the first conveyor device and the third conveyor device.

6. The tray sealer according to claim 5, further comprising a control device which is configured to actuate the second drive arrangement in such a way that the second conveyor device conveys for part of a running time of the first conveyor device and the third conveyor device and is at a standstill for part of the running time of the first conveyor device and the third conveyor device.

7. The tray sealer according to claim 1, wherein the conveyor arrangement further comprises a drive arrangement which is configured to drive the second conveyor device separately from the first conveyor device and the third conveyor device.

8. The tray sealer according to claim 1, further comprising a line converger which is configured to converge the first line of packing trays and the second line of packing trays to form a common line of packing trays in terms of the conveying direction downstream of the center guide.

9. A method for conveying packaging trays along a conveying direction by way of a conveyor device of a tray sealer, the method comprising:

conveying a first line of packaging trays along the conveying direction with a first conveyor device;

conveying a second line of packaging trays along the conveying direction with a second conveyor device which runs laterally alongside the first conveyor device and is separated from the first conveyor device by a center guide extending along the conveying direction between the first conveyor device and the second conveyor device; and jointly driving the first conveyor device and a third conveyor device with a common first drive arrangement, wherein the third conveyor device in terms of the conveying direction adjoins the second conveyor device and extends laterally alongside the first conveyor device along the conveying direction.

10. The method according to claim 9, further comprising driving the second conveyor device separately from the first conveyor device and the third conveyor device with a second drive arrangement.

11. The method according to claim 10, wherein the second drive arrangement is operated for part of a running time of the first conveyor device and the third conveyor device for driving the second conveyor device and is at a standstill for part of the running time of the first conveyor device and the third conveyor device.

12. The method according to claim 9, further comprising converging the first line of packaging trays and the second line of packaging trays in terms of the conveying direction downstream of the center guide.

13. The method according to claim 12, wherein, for converging the first line of packaging trays and the second line of packaging trays, packaging trays of the first line of packaging trays and/or packaging trays of the second line of packaging trays are pushed in a direction perpendicular to the conveying direction.

14. The method according to claim 12, wherein the packaging trays, once the first line of packaging trays and the second line of packaging trays have been converged, are conveyed at least substantially centrally on a conveying surface formed by the first conveyor device and the third conveyor device.

15. A tray sealer comprising:

a sealing station for sealing packaging trays; and a conveyor arrangement for conveying packaging trays away from the sealing station along a conveying direction, the conveyor arrangement comprising:

a first conveyor device for conveying a first line of packaging trays along the conveying direction;

a second conveyor device running laterally alongside the first conveyor device for conveying a second line of packaging trays along the conveying direction;

a center guide which is arranged between the first conveyor device and the second conveyor device and extends along the conveying direction; and a third conveyor device for conveying packaging trays along the conveying direction, wherein the third conveyor device extends adjoining the second conveyor device in terms of the conveying direction laterally alongside the first conveyor device, and the third conveyor device has a greater width than the second conveyor device.

16. The tray sealer according to claim 15, wherein the third conveyor device reaches laterally closer to the first conveyor device than the second conveyor device.

17. The tray sealer according to claim 15, wherein the third conveyor device in terms of the conveying direction adjoins the center guide.

18. The tray sealer according to claim 15, wherein the conveyor arrangement further comprises a first drive arrangement which is configured to jointly drive the first conveyor device and the third conveyor device.

19. The tray sealer according to claim 18, wherein the conveyor arrangement further comprises a second drive arrangement which is configured to drive the second conveyor device separately from the first conveyor device and the third conveyor device.

20. The tray sealer according to claim 19, further comprising a control device which is configured to actuate the second drive arrangement in such a way that the second conveyor device conveys for part of a running time of the first conveyor device and the third conveyor device and is at a standstill for part of the running time of the first conveyor device and the third conveyor device.

* * * * *